(12) United States Patent
Jelenowski et al.

(10) Patent No.: US 9,755,570 B2
(45) Date of Patent: Sep. 5, 2017

(54) CONTROL SYSTEM FOR AN ELECTRIC MOTOR BASED ON A PULSED CONTROL SIGNAL

(71) Applicant: HKR Seuffer Automotive GmbH & Co. KG, Kupferzell (DE)

(72) Inventors: Christian Jelenowski, Kupferzell (DE); Martin Wucherer, Blaufelden/Gammesfeld (DE)

(73) Assignee: HKR SEUFFER AUTOMOTIVE GMBH & CO. KG, Kupferzell (DE)

( * ) Notice: Subject to any disclaimer, the term of this patent is extended or adjusted under 35 U.S.C. 154(b) by 97 days.

(21) Appl. No.: 14/543,125

(22) Filed: Nov. 17, 2014

(65) Prior Publication Data

US 2015/0145456 A1    May 28, 2015

(30) Foreign Application Priority Data

Nov. 22, 2013    (DE) .................. 10 2013 019 666

(51) Int. Cl.
*H02P 25/024*    (2016.01)
*H02P 31/00*    (2006.01)

(52) U.S. Cl.
CPC .................................. *H02P 31/00* (2013.01)

(58) Field of Classification Search
CPC ........ H02P 27/04; H02P 27/047; H02P 31/00; H02P 6/08; H02P 7/29
USPC .. 318/400.09, 461, 504, 568.17, 568.2, 590, 318/599, 603, 807
See application file for complete search history.

(56) References Cited

U.S. PATENT DOCUMENTS

| 4,333,115 | A | * | 6/1982 | Junio | G11B 15/54 |
| | | | | | 242/333.7 |
| 4,486,692 | A | * | 12/1984 | Sonoda | G11B 15/1808 |
| | | | | | 318/258 |
| 4,599,569 | A | * | 7/1986 | Furuhata | H02P 23/186 |
| | | | | | 327/176 |
| 4,959,969 | A | * | 10/1990 | Okamoto | F25B 49/025 |
| | | | | | 236/78 D |
| 5,616,979 | A | * | 4/1997 | Nishikawa | H02N 2/14 |
| | | | | | 310/316.02 |
| 5,744,927 | A | * | 4/1998 | Hayashida | H02P 21/0003 |
| | | | | | 318/599 |
| 6,850,536 | B2 | * | 2/2005 | May | H04L 49/103 |
| | | | | | 370/383 |
| 7,362,062 | B2 | * | 4/2008 | Schneider | H02P 6/182 |
| | | | | | 318/254.1 |

(Continued)

FOREIGN PATENT DOCUMENTS

DE        3541277 A1    5/1987
DE        19831931 A1   2/1999

(Continued)

*Primary Examiner* — Bentsu Ro
(74) *Attorney, Agent, or Firm* — Ware, Fressola, Maguire & Barber LLP

(57) ABSTRACT

The present invention concerns a control system for an electric motor, wherein an operating mode with predetermined value assignments is selected for a parameter set for controlling an electric motor and the pulse frequency of a control signal for the electric motor is set in accordance with the selected operating mode in order thereby to signal to the electric motor the selected value assignments for the parameter set.

15 Claims, 1 Drawing Sheet

(56) References Cited

U.S. PATENT DOCUMENTS

| | | | |
|---|---|---|---|
| 7,626,836 B2* | 12/2009 | Leggate | H02M 7/53875 318/599 |
| 7,629,764 B2* | 12/2009 | Shoemaker | G05B 13/042 318/432 |
| 7,821,220 B2 | 10/2010 | El-Ibiary | |
| 8,226,374 B2* | 7/2012 | Peterson | A61H 33/005 318/599 |
| 8,649,923 B2* | 2/2014 | Sankaran | B60L 15/02 180/65.285 |
| 8,896,253 B2* | 11/2014 | Wu | F04D 27/004 318/400.29 |
| 2007/0126497 A1* | 6/2007 | Palaniappan | H02M 1/08 327/589 |

FOREIGN PATENT DOCUMENTS

| | | |
|---|---|---|
| DE | 69033164 T2 | 2/2000 |
| DE | 10031529 A1 | 1/2002 |
| DE | 10254080 A1 | 4/2005 |
| DE | 102004043506 A1 | 3/2006 |
| DE | 102006034998 A1 | 2/2007 |
| DE | 102008001782 A1 | 11/2009 |
| DE | 102010004545 A1 | 8/2010 |
| DE | 102010017549 A1 | 1/2011 |
| DE | 102010009662 A1 | 9/2011 |

\* cited by examiner

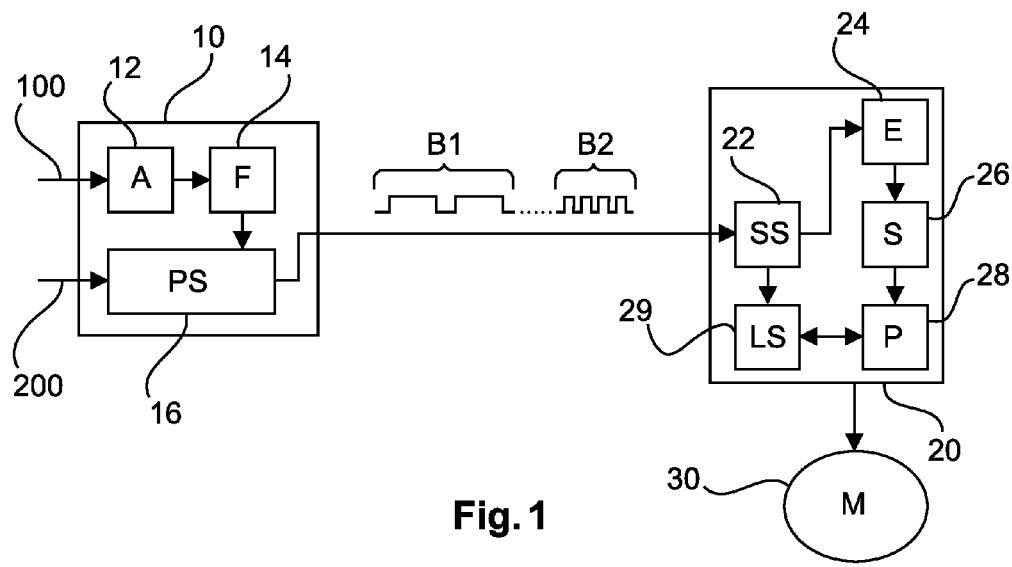
Fig. 1
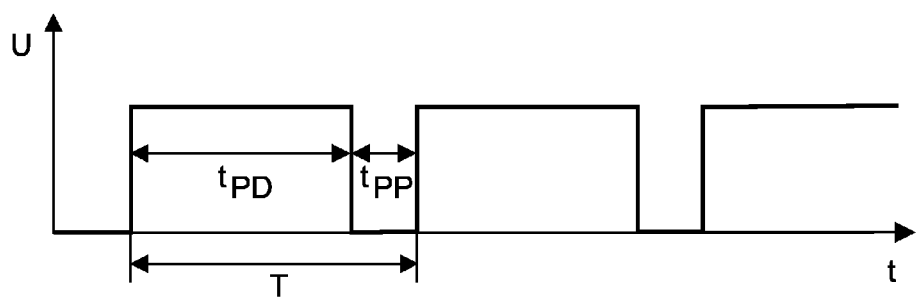
Fig. 2
| f | B |
|---|---|
| 50 Hz | $B_N$ |
| 120 Hz | $B_T$ |
| 300 Hz | $B_{25-16}$ |
| 400 Hz | $B_{32-20}$ |
Fig. 3
| f | $I_{max}$ / fs |
|---|---|
| 50 Hz | 10 A |
| ⋮ | ⋮ |
| 120 Hz | 30 A |
| ⋮ | ⋮ |
| 300 Hz | 17 kHz |
| ⋮ | ⋮ |
| 400 Hz | 25 kHz |
Fig. 4

CONTROL SYSTEM FOR AN ELECTRIC MOTOR BASED ON A PULSED CONTROL SIGNAL

CROSS REFERENCE TO RELATED APPLICATION

This application claims priority under 35 USC §119 to German Patent Application No. 10 2013 019 666.3 filed on Nov. 22, 2013, which application is hereby incorporated by reference in its entirety.

TECHNICAL FIELD

The present invention concerns a control apparatus, a motor regulator and a control method for controlling an electric motor, in particular a ventilator fan for motor vehicles, by means of a pulsed control signal.

BACKGROUND OF THE INVENTION

The standard "Local Interconnect Network" (LIN) was developed as a specification for a serial communication system as a new de-facto standard in particular for inexpensive communication of intelligent sensors and actuators in motor vehicles. The LIN serves in particular for inexpensive communication and is based on a one-wire bus which can be associated with the field buses. The LIN is composed of a master device and one or more slave devices. The master device has knowledge about the temporal sequence of all data to be transmitted. Those data are transmitted by the corresponding slave devices when they are required to do so by the master device. That is effected by sending out a message header characterised by a given message address. Subsequently the slave device connects its data output to the bus.

The new LIN standard is also intended for communication between control devices and motor regulators for electric motors in motor vehicles. Thus for example voltages or currents in radiator cooling fan regulators and interior fan regulators are regulated by means of corresponding signals or messages by way of various interfaces like for example pulse width modulation (PWM) and LIN. In that case an LIN interface has the advantage of greater flexibility over a PWM interface as various messages can be communicated while the PWM interface can only deliver a signal frequency and a pulse duty cycle. In the case of the PWM interface, it was possible to achieve a certain degree of flexibility by a variation in the pulse duty cycle, for example between 0% and 100%.

FIG. 2 shows a diagrammatic time graph of a PWM signal in pulse form, showing the period duration T, the pulse duration $t_{PD}$ and the pulse pause $t_{PP}$. In this case the frequency of the PWM signal occurs as the inverse of the period duration, that is to say $f=1/T$.

As many control systems are based on a PWM-based control there is a need for backward compatibility so that conventional PWM-based devices can communicate with more recent LIN-based devices, that is to say the information which can be transmitted by means of the LIN can also be transmitted by way of a PWM-interface.

SUMMARY OF THE INVENTION

Therefore the object of the present invention is to improve a PWM-based control system to the effect that use is possible in conjunction with more recent control components which expect LIN-specific information.

That object is attained by a control apparatus as set forth in claim 1, a motor regulator as set forth in claim 7 and a control method as set forth in claim 11.

Accordingly a parameter set for controlling the electric motor is defined by an operating mode which in turn is linked to the pulse frequency of the pulsed control signal so that the selected value assignment for the parameter set can be signaled to the electric motor by means of the pulsed control signal. The signaled pulse frequency of the control signal is communicated to the motor regulator of the electric motor and detected there, wherein the parameter set for operation of the electric motor is determined in dependence on the detected pulse frequency.

It is also possible to provide different frequencies or frequency ranges (frequency windows) for a plurality of operating modes so that parameter values like for example overcurrent thresholds, overvoltage thresholds, fan switching frequencies, current rise and fall limits and so forth can be signaled.

Switching over to another parameter set is thus possible by simply changing the frequency of the control signal.

In addition the proposed signaling method can also be used for selecting between a normal mode and a test mode. Adjustment of the pulse frequency can be effected directly by way of a frequency-determining element or a frequency-determining circuit or by changes to the period duration by means of suitable time-determining element or a suitable time-determining circuit.

Establishing the parameter set in accordance with the operating mode can also be implemented in dependence on a predetermined motor manufacturer so that the control system can be adapted to different manufacturers of electric motors like for example ventilator fans or the like.

Further advantageous developments are recited in the appendant claims.

BRIEF DESCRIPTION OF THE DRAWINGS

The invention is described in greater detail hereinafter by means of embodiments by way of example with reference to the accompanying drawings in which:

FIG. 1 shows a schematic block circuit diagram of a control system according to the first embodiment, FIG. 2 shows a time graph of a PWM-control signal, FIG. 3 shows a table with a first assignment specification between frequencies and parameter-determining operating modes, and FIG. 4 shows a second table with assignment specifications between frequencies and parameters.

DETAILED DESCRIPTION

Set out hereinafter is a description of a preferred embodiment by way of example with reference to a control system of a ventilator fan motor in a motor vehicle.

FIG. 1 shows a schematic block circuit diagram of the control system in which a motor regulator 20 (here: fan regulator) for an electric motor (here: fan motor (M)) 30 is controlled by way of a PWM signal provided in a control device 10. General regulation of the fan motor 30 is effected by way of a control input signal 200 which is passed to a PWM-control unit (PS) 16, the PWM-control unit 16 generating a PWM-signal whose pulse duration or duty cycle is altered in dependence on the control signal 200. The PWM-control signal is passed to a fan control (LS) 29 in the fan regulator 22, which then controls the fan motor 30 in accordance with the control input signal 200. The control input signal 200 can also involve a control signal 200 generated in dependence on a feed-back signal from the fan motor 30 so that a closed control loop is formed for regulating the fan motor 30.

In accordance with the embodiment the control device has an additional input for the selection of an operating mode or a parameter set, by way of which a parameter control signal 100 can be input. The parameter control signal 100 can be input manually by a user or can be generated automatically by the control system in dependence on environmental conditions and/or other system-relevant properties. The control device 10 includes a selection unit (A) 12 which receives and evaluates the parameter control signal 100 and, in dependence on the parameter control signal 100, selects an assigned operating mode and/or an assigned parameter set. That can occur in dependence on a storage table, an address memory or other link or logic circuits. The selection of the operating mode or the parameter set is passed to a frequency selection unit (F) 14 which feeds the pulse control unit 16 with a suitable control signal for establishing the frequency of the PWM-control signal. That conversion of the operating mode or the parameter set into a frequency in respect of the control signal can also be implemented on the basis of a storage table, an addressable memory, a selection circuit or a logic circuit. Conversion of the parameter control signal 100 into the frequency selection signal of the frequency selection unit 14 can also be implemented by a one-time conversion in an individual storage table, an individual addressable memory, an individual selection circuit or an individual selection logic means.

As can be seen from FIG. 1 therefore, besides the pulse width or pulse duty cycle information in respect of the PWM-control signal, additional information in regard to the operating mode or the parameter set can be transmitted by the frequency of the PWM-control signal to the fan regulator 20. As shown in FIG. 1 firstly an operating mode B1 at a lower frequency in respect of the PWM-signal is transmitted and later a second operating mode B2 at a higher frequency in respect of the PWM-signal is transmitted.

At the fan regulator 20 the PWM-signal is passed to an interface (SS) 22 which feeds the PWM-control signal to the fan control 29. In addition the PWM-signal or at least a signal corresponding to the frequency of the PWM-control signal is passed on to a detection unit (E) 24 which detects the frequency of the PWM-control signal and passes the result of the detection step to an adjusting unit (S) 26. The adjusting unit 26 performs corresponding parameter setting in dependence on the signaled parameter set or the signal operating mode and stores the signaled parameter set in a first parameter memory (P) 28.

The fan control 29 can thus access the parameter memory 28 and acquires the parameter set desired for the currently prevailing operating mode or the currently prevailing parameter choice, for control of the fan motor 30.

The blocks of the control device 10 and the fan regulator 20 shown in FIG. 1 can be in the form of discrete hardware circuits, logic digital circuits, gate arrays or programmable logic circuits (PLDs) or software-controlled processors.

In a first practical example of the embodiment, corresponding to the table shown in FIG. 3, it is possible to select between a test operating mode and a normal mode for example by way of the frequency of the PWM-control signal. Thus for example at a frequency f=50 Hz, it is possible to set a normal mode $B_N$ of the fan regulator 20 while at a frequency f=120 Hz of the PWM-control signal the fan regulator 20 is put into a test operating mode $B_T$. Specific values can be assigned to predetermined parameters as further frequencies or frequency windows with additional operating modes, in which case the parameters can be for example overcurrent thresholds, overvoltage thresholds, fan switching frequencies, current rise and current fall limits and so forth.

Referring to FIG. 3 for example in addition to the normal operating mode and the test operating mode at a frequency f=300 Hz of the PWM-control signal, an operating mode $B_{25-16}$ is set, in which case the overcurrent threshold is 25A, the fan switching frequency is 16 kHz, the current rise is at a maximum 7 A/s and the current fall is at a maximum 20 A/s. In addition an operating mode $B_{32-20}$ is signaled by a frequency f=400 Hz of the PWM-control signal, in which case then the overcurrent threshold is 32A, the fan switching frequency is 20 kHz, the current rise is at a maximum 10 A/s and the current fall is at a maximum 30 A/s.

Different operating modes or parameters can then also be transmitted by switching over between different frequencies of the PWM-signal. Thus for example after the expiry of a predetermined period of time (for example a second) another frequency (and thus another parameter set and thus another operating mode) could be signaled. It will be appreciated that, instead of establishing the frequency, it is also possible to apply the period duration of the PWM-control signal.

To reduce the tolerance in respect of frequency or period measurement it is also possible to use a reference frequency (or reference period). Thus for example a frequency f=500 Hz can be transmitted as a fixed frequency while all other frequencies can be established proportionally thereto. The time until all parameters are transmitted and the first parameter occurs again can also be predetermined as the reference. As a further practical example, various frequencies of the PWM-signal can also be signaled for signaling respective users or manufacturers and correspondingly predetermined required characteristics of the control system, in which case another frequency of the PWM-signal is associated with various users or manufacturers.

FIG. 4 shows a table of a further practical example in which a range-dependent linear control of the maximum current of the fan regulator 20 or the switching frequency of the fan regulator 20 can be signaled. As shown in FIG. 4 in a frequency range of between f=50 Hz and f=150 Hz control is implemented linearly or successively from a maximum current $I_{max}$=10 A to a maximum current of $I_{max}$=30 A, while between a frequency f=170 Hz and a frequency f=250 Hz of the PWM-control signal a switching frequency of between 17 kHz and 25 kHz can be signaled. Thus continuous or successive current limitation to 10 A (at f=50 Hz) to 30 A at (f=150 Hz) and continuous or successive regulation of the switching frequency of the fan regulator 20 is accordingly possible.

It will be appreciated that any other links between the frequency of the PWM-control signal and predetermined parameters, operating modes or parameter sets can readily be envisaged and are comprehensible to the man skilled in the art. Thus different types of fan motors or ventilating blowers from the same or different manufacturers can also be signaled by different frequencies of the PWM-control signal.

The present invention is not limited to the fan motor control in accordance with the above-described embodiment but can be used for the most widely varying motor control and regulating situations in dependence on pulsed control signals in order thereby in addition to pulse width control also to permit a transmission of operating modes or param-

What is claimed is:

1. A control apparatus for controlling an electric motor by means of a pulse width modulation control signal, wherein the control apparatus comprises:
 a selection unit configured to select an operating mode with predetermined value assignments for a parameter set for controlling the electric motor; and
 a frequency selection unit in communication with the selection unit, the frequency selection unit configured to select a pulse frequency of the pulse width modulation control signal in accordance with the selected operating mode selected by the selection unit in order thereby to signal to the electric motor the selected value assignments for the parameter set based on said pulse frequency of the pulse width modulated control signal.

2. The control apparatus as set forth in claim 1, wherein the selection unit is configured to select the operating mode from a plurality of operating modes of different manufacturers or users.

3. The control apparatus as set forth in claim 1, wherein the selection unit is configured to select the operating mode from a plurality of operating modes with different current limit values, fan switching frequencies, current rise rates and/or current fall rates.

4. The control apparatus as set forth in claim 1, wherein the selection unit is configured to select between a normal mode and a test mode.

5. The control apparatus as set forth in claim 1, wherein the frequency selection unit is configured to set the pulse frequency by a change in a period duration of the pulse width modulation control signal.

6. The control apparatus as set forth in claim 1, wherein the control apparatus is configured to control an electric motor for a ventilator fan of a motor vehicle.

7. A motor regulator comprising:
 an interface configured to receive a pulse width modulation control signal for controlling an electric motor;
 a detection unit in communication with the interface, the detection unit configured to detect a pulse frequency of the pulse width modulation control signal; and
 an adjusting unit in communication with the detection unit, the adjusting unit configured to adjust a value for at least one motor parameter for operating the electric motor in dependence on the detected pulse frequency.

8. The motor regulator as set forth in claim 7, wherein the adjusting unit is configured to adjust the parameter set of a given motor manufacturer.

9. The motor regulator as set forth in claim 7, wherein the adjusting unit is configured to adjust a current limit value, a fan switching frequency, a current rise rate and/or a current fall rate.

10. The motor regulator as set forth in claim 7, wherein the parameter set corresponds to a normal mode or a test mode.

11. The motor regulator as set forth in claim 7, wherein the detection unit is configured to detect the pulse frequency by measurement of a period duration of the pulse width modulation control signal.

12. A method of controlling an electric motor of a ventilator fan by means of a pulse width modulation control signal, comprising the steps of:
 selecting an operating mode with predetermined value assignments for a parameter set for controlling the electric motor;
 setting a pulse frequency of the pulse width modulation control signal in accordance with the selected operating mode in order thereby to signal to the electric motor the selected value assignments for the parameter set;
 detecting the pulse frequency of the pulse width modulation control signal at the ventilator fan; and
 setting the parameter set for operation of the electric motor in dependence on the operating mode determined by the detected pulse frequency.

13. A control system comprising:
 a control apparatus for controlling an electric motor by means of a pulsed control signal, wherein the control apparatus comprises:
  a selection unit configured to select an operating mode with predetermined value assignments for a parameter set for controlling the electric motor, and
  a frequency selection unit configured to select a pulse frequency of the control signal in accordance with the selected operating mode in order thereby to signal to the electric motor the selected value assignments for the parameter set; and
 a motor regulator comprising:
  an interface configured to receive the pulsed control signal for controlling an electric motor,
  a detection unit configured to detect the pulse frequency of the control signal, and
  an adjusting unit configured to adjust the parameter set for operation of the electric motor in dependence on an operating mode determined by the detected pulse frequency;
 wherein the motor regulator is controlled by the control apparatus.

14. The control system as set forth in claim 13, wherein the control system is adapted for use in a motor vehicle.

15. A control apparatus for controlling an electric motor by means of a pulse width modulation control signal, wherein the control apparatus comprises:
 a selection unit configured to select an operating mode with predetermined value assignments for a parameter set for controlling the electric motor; and
 a frequency selection unit in communication with the selection unit, the frequency selection unit configured to select a pulse frequency of the pulse width modulation control signal in accordance with the selected operating mode in order thereby to signal to the electric motor the selected value assignments for the parameter set, and
 a pulse control unit configured to receive a control input signal and to receive the pulse frequency selected by the frequency selection unit, the pulse control unit configured to generate a pulse width modulated signal whose pulse duration is altered in dependence on the control input signal and whose frequency selects a value assignment for at least one parameter for operating the electric motor.

* * * * *